United States Patent [19]
Senger

[11] Patent Number: 6,150,644
[45] Date of Patent: Nov. 21, 2000

[54] METHOD OF CURING WINDING COILS OF ELECTRICAL MACHINES

[75] Inventor: Rudolf Senger, Pegnitz, Germany

[73] Assignee: Siemens AG, Munich, Germany

[21] Appl. No.: 09/161,171

[22] Filed: Sep. 25, 1998

[30] Foreign Application Priority Data

Sep. 25, 1997 [DE] Germany ............................ 197 42 427

[51] Int. Cl.⁷ .................................................. H05B 6/10
[52] U.S. Cl. ............................. 219/635; 219/675; 29/264
[58] Field of Search ................................ 219/635, 636, 219/637, 632, 675, 677, 645, 633, 634; 29/264

[56] References Cited

U.S. PATENT DOCUMENTS

| | | | |
|---|---|---|---|
| 2,589,777 | 3/1952 | Collins | 219/47 |
| 3,574,031 | 4/1971 | Heller, Jr. et al. | 156/273 |
| 3,671,703 | 6/1972 | Keller | 219/638 |
| 3,848,107 | 11/1974 | Lewis | 219/672 |
| 3,858,067 | 12/1974 | Otto | 310/42 |
| 3,892,034 | 7/1975 | Arakelov et al. | 29/596 |
| 4,043,722 | 8/1977 | Baker et al. | 425/174.8 R |
| 4,468,549 | 8/1984 | Arnosky | 219/637 |
| 4,516,104 | 5/1985 | McDermott | 336/206 |
| 4,543,555 | 9/1985 | McDermott | 336/206 |
| 4,673,781 | 6/1987 | Nuns et al. | 219/632 |
| 4,788,394 | 11/1988 | Vanneste et al. | 219/636 |
| 4,874,916 | 10/1989 | Burke | 219/671 |
| 5,270,511 | 12/1993 | Iguchi | 219/667 |
| 5,530,227 | 6/1996 | Matsen et al. | 219/633 |
| 5,793,024 | 8/1998 | Matsen et al. | 219/633 |

FOREIGN PATENT DOCUMENTS

| | | |
|---|---|---|
| 590 161 | 12/1933 | Germany . |
| 1 212 203 | 3/1966 | Germany . |

OTHER PUBLICATIONS

"*Electrically Heated Hydraulic Coil Presses*", MICAFIL, Zurich, Switzerland, M 15 970/2, S. 1–8.

Primary Examiner—Teresa Walberg
Assistant Examiner—Jeffrey C Pwu
Attorney, Agent, or Firm—Kenyon & Kenyon

[57] ABSTRACT

Method and device for time-optimized curing of winding coils and/or rods of electrical machines having winding coils and/or rods with groove and coil face areas and have at least one individual conductor provided with a curable material. The coated conductor insulation or a conductor assembly is inductively heated prior to, and/or during the inductive heating process and/or thereafter, the winding coils and/or rods are pressed and the winding coils and/or rods are cooled. With this method and device, time-optimized manufacture of winding coils and/or rods can be manufactured with reproducible quality results.

11 Claims, 5 Drawing Sheets

METHOD OF CURING WINDING COILS OF ELECTRICAL MACHINES

FIELD OF THE INVENTION

The present invention relates to a method and a device for curing winding coils of electrical machines, which winding coils contain groove areas and face areas and have at least one individual conductor provided with curable material.

BACKGROUND INFORMATION

Groove areas of winding coil or rod insulations to be cured with the help of gas-, oil- or electrically heated single-stage or multistage presses are conventionally brought to a required temperature in order to cure the insulation material. The winding coil or rod is heated at a predefined pressure for a certain period of time. Depending on the coil section, heating times of up to one hour are common. Subsequently, the coils are cooled again under pressure by a press. In this process the entire coil is heated. This is desirable, for example, in the case of winding coils or rods for main poles of DC motors. In winding coils or rods for three-phase motors, where only those parts of winding coils or rods that are in the grooves are to be heated, a heat flow is created in the coil face area due to the long heating process.

Commercially available conductor insulating materials have the disadvantage, due to the conductor heat flow even outside the groove-side area, that they conglutinate in the draw radius area. This results in damage to the conductor insulation that may range from quality-impairing to unacceptable when the coil is drawn. Attempts to stop the heat flow or to prevent it by cooling outside the groove-side area have shown that these measures are very costly and yield no reproducible quality results. When changing coil sections, for example, the process data (heating period, heating intensity) must always be determined anew.

SUMMARY OF THE INVENTION

An object of the present invention is to reduce the heating phase, while ensuring reproducible curing quality of the conductor insulation materials on or in winding coils to a degree that the harmful heat flow in the coil area becomes negligible. In addition, it should be possible to adjust the heating process to the coil cross section and conductor insulating material at hand.

This object is achieved according to the present invention by inductively heating a conductor assembly or the coated conductor insulation, pressing the winding coils and/or rods to be cured prior to and/or during the inductive heating process and/or thereafter, cooling the winding coils.

These process steps result in a considerable reduction in the heating time from approximately one hour to a few seconds. The shape, i.e., cross section, of the winding coils (flat or round wire windings, barrel coils, main pole coils and commutating poles for DC machines, half-form, rectangular and oval coils) as well as rods (e.g.: grid, Roebel bars, turbo, ferrule rods), now forms a predefinable parameter during inductive heating. Therefore almost no heat removal takes place in the draw radius area of the winding coils due to the considerably reduced heating time (a few seconds), so that no undesirable conglutination resulting in conductor insulation damage, occurs there. In order to avoid such conglutination, preferably only the winding coil groove areas located in the grooves may be inductively heated. The undesirable heat flow can be further reduced using additional cooling systems each having a plurality of cooling elements preferably in the draw radius area of the winding coils. Another economic advantage is the fact that these process steps can also be performed by appropriately modifying known single-stage or multistage presses.

In another embodiment of the present invention, the penetration depth into the curing material of the conductor insulation due to the skin effect is predetermined through a predefinable low-frequency, medium-frequency or high-frequency power supplied to the inductors.

The inductor cooling elements themselves and preferably additional cooling elements or cooling systems used in the groove area or coil face area accelerate the entire curing process and allow the winding coils or rods to be processed without interruptions, since the cooling times are short.

In another embodiment, process steps executed simultaneously, such as heating and pressing, or pressing and cooling, result in further reduction in the processing times of the winding coils or rods and thus increase the processing capacity.

The throughput of winding coils or rods can be further increased in another preferred embodiment using a continuous process, where the winding coil or rod is secured using a press device on a kind of assembly line and thus moves into the inductive heating device, where the winding coil or rod in the press device has different dwell times depending on the coil type. Subsequently the press device is moved into the cooling area where it is quickly cooled to temperatures of approximately 40°–50° C., which allow the winding coil or rod to be further processed.

DETAILED DESCRIPTION

Figure 1:
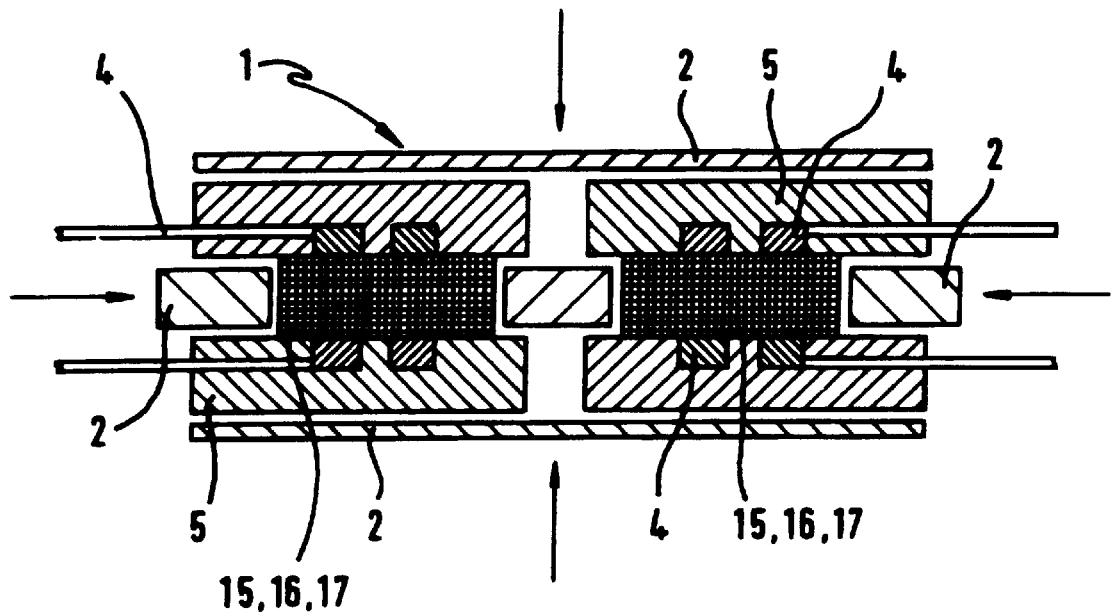
FIG. 1 shows a device for inductive heating of winding coils or rods according to the present invention.

FIG. 1 shows an inductive heating device 1 with horizontal and vertical press elements 2. Winding coils 15, 17 or rod 16, placed in such an inductive heating device 1 are surrounded by inductors 4 and their cooling elements 5. Press elements 2 and winding coils. 15, 17 and rods 16 are cooled. A plurality of cooling elements 5 are combined into a cooling system 20. A plurality of cooling systems 20 operating in parallel can also be used either to better control the individual cooling processes or to better adapt the heat load to the inductive heating process 31.

Figure 2:
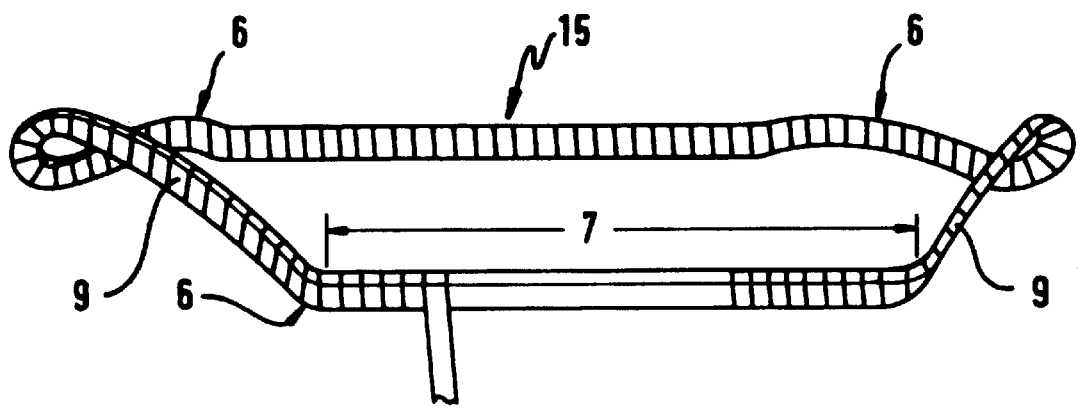
FIG. 2 shows a bobbin.
Figure 3:
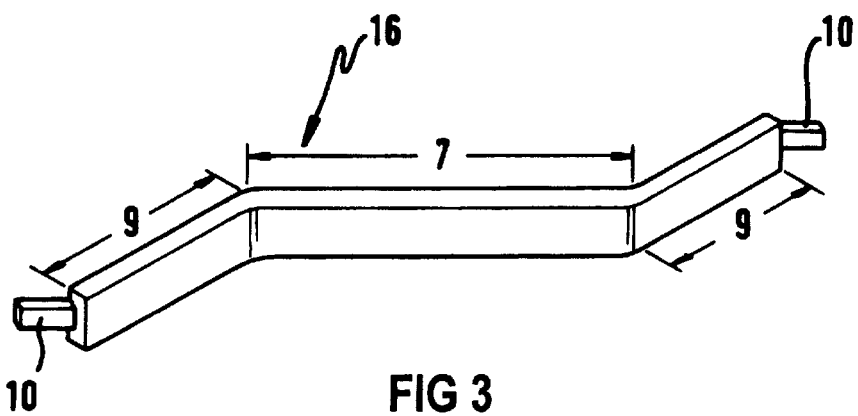
FIG. 3 shows a ferrule rod.
Figure 4:
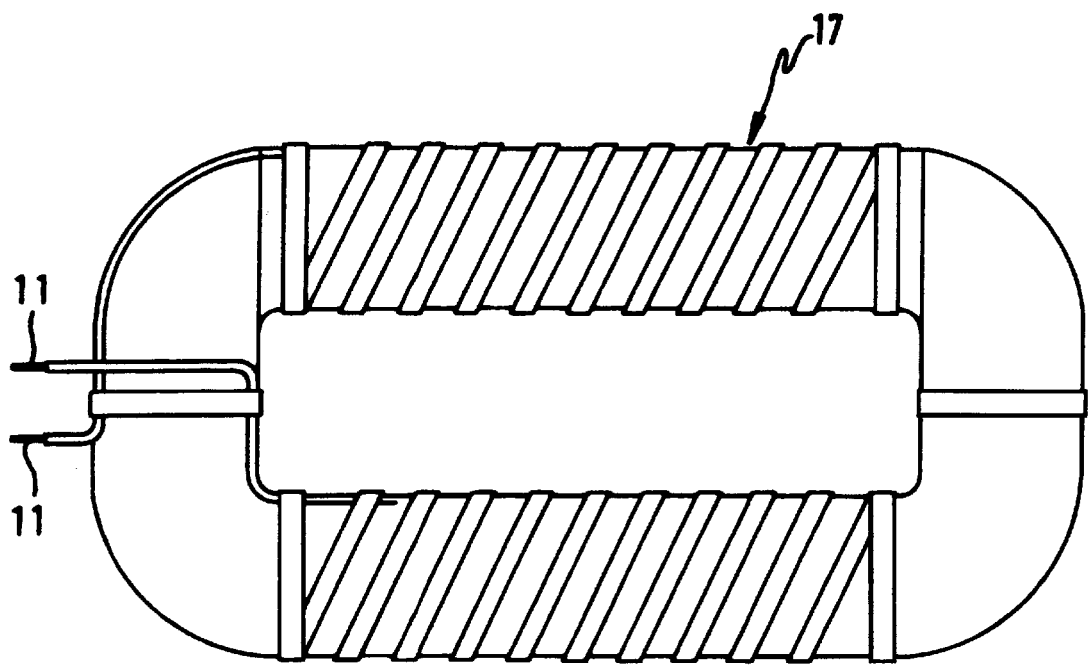
FIG. 4 shows a main pole winding coil of a DC motor.

FIG. 2 shows a drawn and wound bobbin 15 with its draw radii 6 that are critical for conventional heating processes. As shown in FIG. 3, groove areas 7 and coil face areas 9 can be seen. A ferrule rod 16 also includes switching ends 10. FIG. 4 shows a main pole winding coil 17 of a DC motor with a wound wire and two terminals 11.

Device 1 illustrated in FIG. 1 can be adapted to the respective dimensions and requirements for all winding coils 15, 17 and rods 16. Due to its short time of action, this inductive heating device 1 can be used both for windings 15 or rods 16, whose groove areas are heated, bobbins 15 and ferrule rods 16, and for entire main pole winding coils 17. Process parameters such as penetration depth of the radiated heat, effective areas of the heat radiation on the winding coil or rod can be determined in advance with established quality criteria, such as degree of curing or temperature class of the electrical machine, for example.

Figure 5:
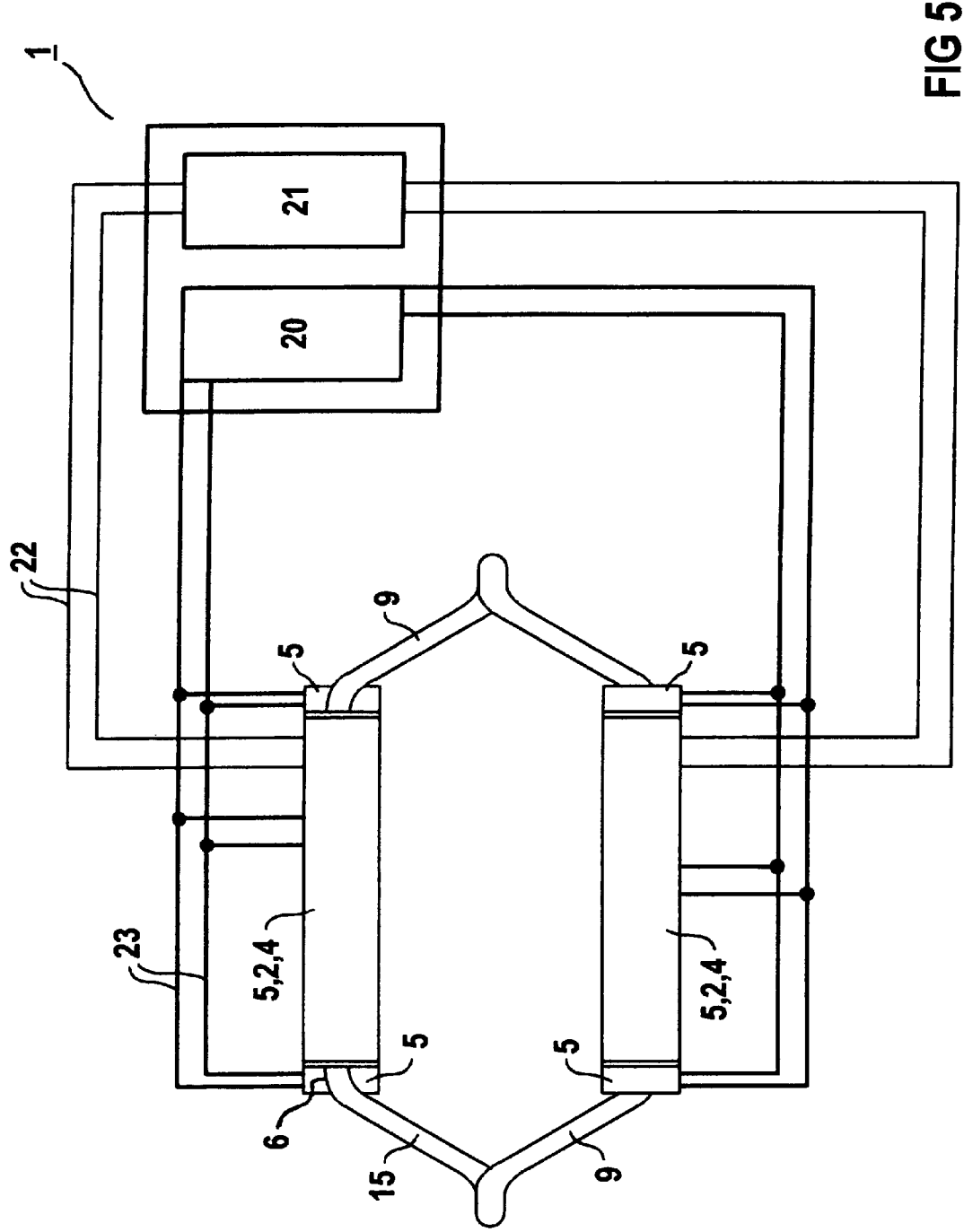
FIG. 5 is another schematic drawing of an inductive heating device.

FIG. 5 shows a bobbin 15, which is used in such an inductive heating device 1. Groove areas 7 of bobbin 15 are in the heating area of inductors 4, as well as in the area of cooling elements 5 and the horizontal and vertical press elements 2. Preferably additional cooling elements 5 are provided especially for draw radii 6 of bobbin 15. All cooling elements 5, both of draw radii 6 and of groove areas 7 (not illustrated), are preferably connected in parallel to a cooling system 20 via cooling lines 23. Inductors 4 are connected, via electrical supply lines 22, to a power supply and control unit 21. Power supply and control unit 21 regulates both the frequency and the time of action of inductors 4. Furthermore, power supply and control unit 21 can trigger cooling system 20 when more or less cooling power is required due to modified parameters (e.g., cross-section of a rod 16, time of action, etc.).

Figure 6:
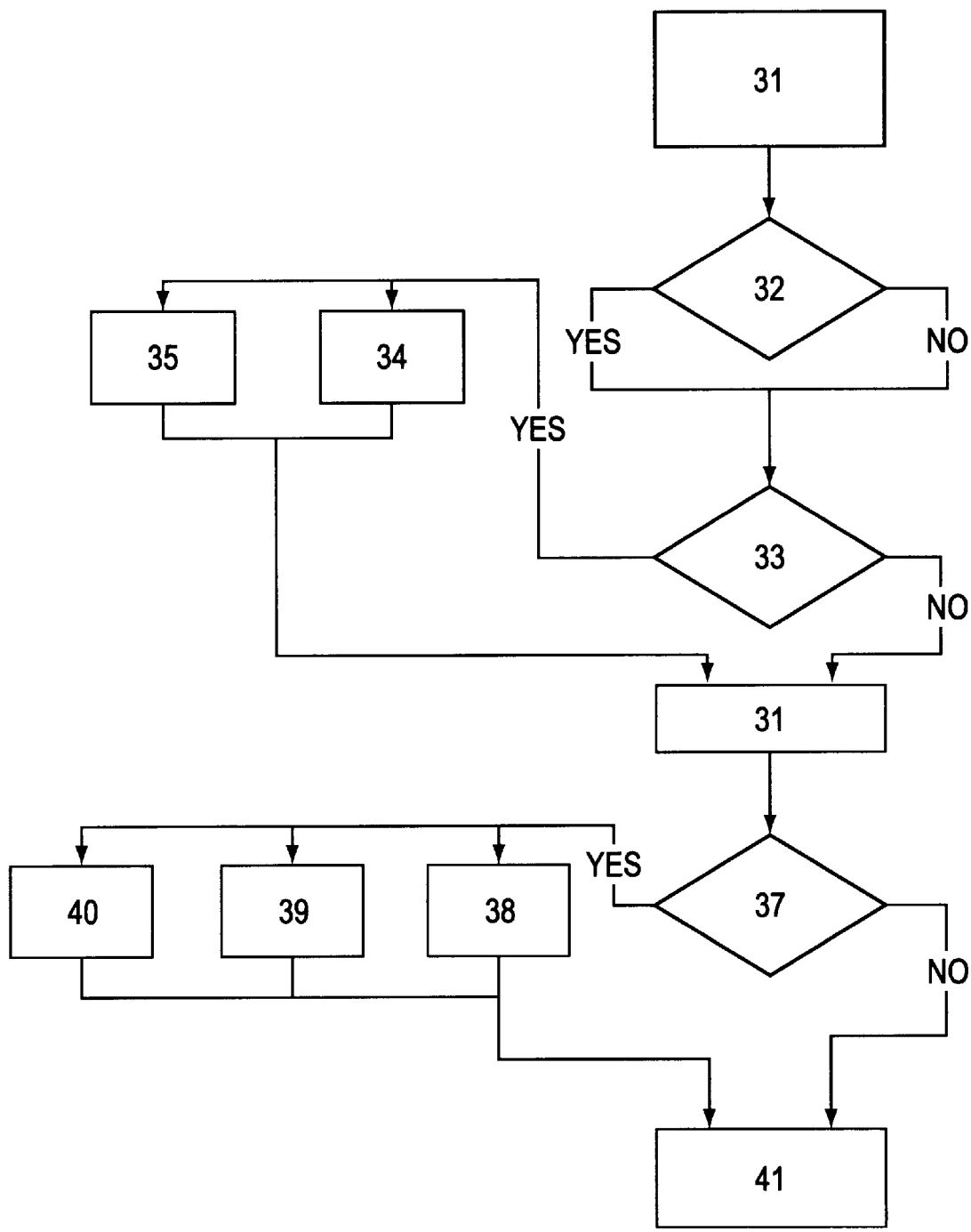
FIG. 6 is a flow chart of a heating process according to the present invention.

FIG. 6 is a flow chart of such a process, in which, for example, bobbin 15 is inductively heated 31 by inductors 4, with optional cooling 32 of draw radii 6. If pressing 33 is required, bobbin 15 can be pressed intermittently 34 or continuously 35. Further inductive heating 31 of bobbin 15 takes place, if necessary, with pressed 34, 35 or simply inserted bobbin 15. If cooling 37 of the entire bobbin is required, this can be done without pressing 38, with pressing 39, or with intermittent pressing 40. After cooling 37, bobbins 15 can be removed 41.

Figure 7:
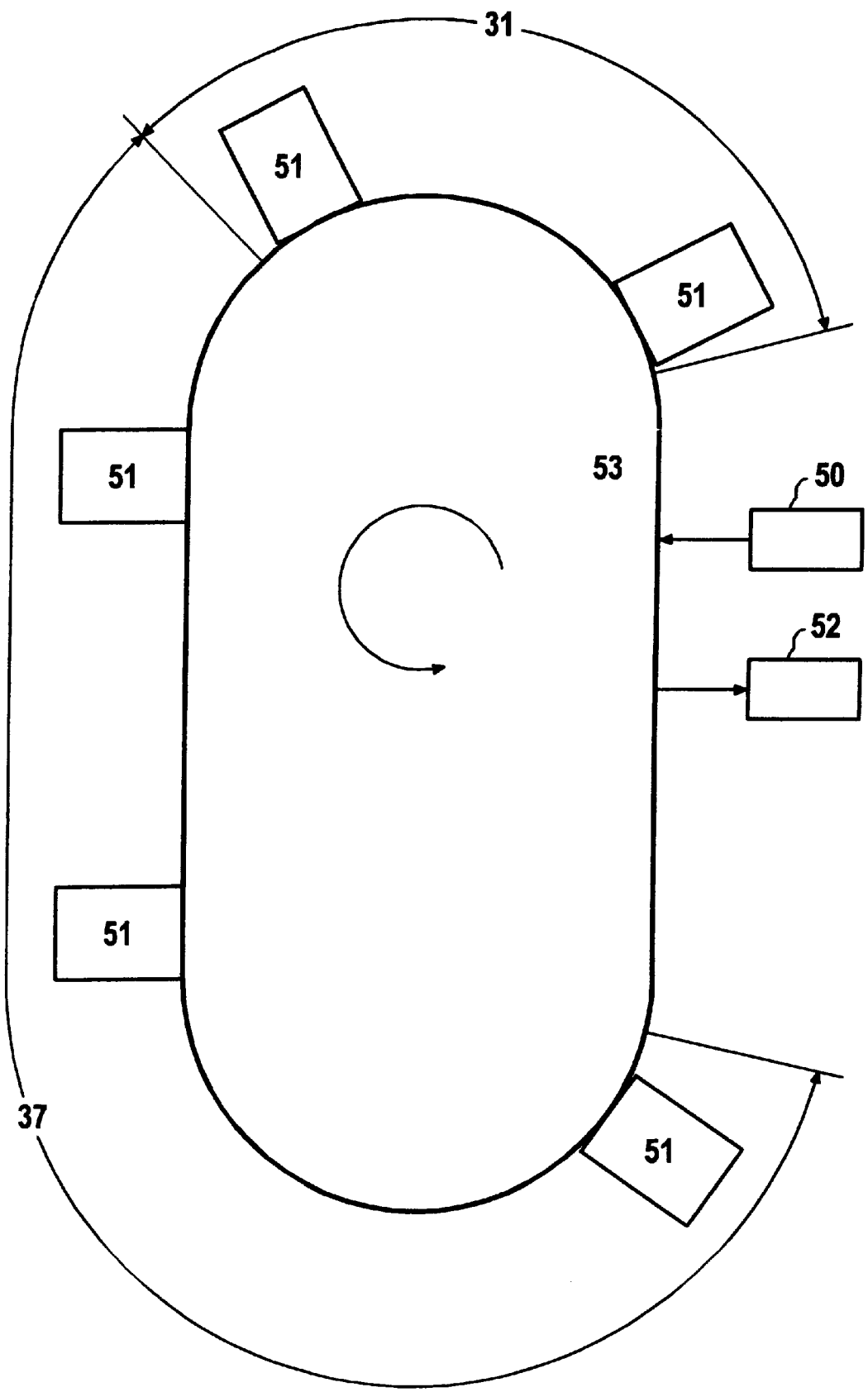
FIG. 7 is a block diagram of a continuous manufacturing process implemented as an assembly line.

FIG. 7 shows a schematic diagram of a continuous process on a kind of assembly line 53 for inductive heating 31 with simultaneous optional cooling 32 of draw radius area 6 of winding coils 15, 17 or rods 16 inserted 50 into one or several movable pressing devices 51 (not illustrated in detail) with pressing elements 2 and subsequently moved into an inductive heating device 1 with inductors 4. This area of inductive heating 31 is followed by a cooling area 37 of winding coils 15, 17 or rods 16 by cooling elements 5 of one or several cooling systems 20. At 52 the coils are removed from assembly line 53. Using this arrangement, the throughput of processed winding coils 15, 17 or rods 16 can be increased considerably.

What is claimed is:

1. A method of curing at least one of a winding coil and a rod of an electrical machine, the at least one of the winding coil and rod having a groove face area and a coil face area and includes at least one individual conductor provided with a curable material, the method comprising the steps of:

inductively heating one of i) a coated conductor insulation of the at least one individual conductor and, ii) a conductor assembly including the at least one individual conductor using an inductor which is separate from the at least one of the winding coil and the rod;

pressing the at least one of the winding coil and rod, the pressing step being performed at least one of i) prior to, ii) during, and iii) after the inductively heating step; and cooling the at least one of the winding coil and rod.

2. The method according to claim 1, further comprising the step of:

supplying the inductor with one of a low-frequency, medium-frequency and high-frequency power to control a penetration depth of a heat radiation via a skin effect.

3. A method of curing at least one of a winding coil and a rod of an electrical machine, the at least one of the winding coil and rod having a groove face area and a coil face area and includes at least one individual conductor provided with a curable material, the method, comprising:

inductively heating one of i) a coated conductor insulation of the at least one individual conductor and, ii) a conductor assembly including the at least one individual conductor, the inductively heating step being performed by an inductor;

supplying the inductor with one of a low-frequency, medium-frequency and high-frequency power to control a penetration depth of a heat radiation via a skin effect;

pressing the at least one of the winding coil and rod, the pressing step being performed at least one of i) prior to, ii) during, and iii) after the inductively heating step;

cooling the at least one of the winding coil and rod inductively heating at least one of i) the entire at least one of the winding coil and rod, and ii) only groove areas in the grooves of the at least one of the winding coil and rod;

simultaneously with the inductively heating step, cooling a coil face not to be cured; and after the inductively heating step, cooling, via at least one of the inductive heating system and an additional cooling system, the inductively heated at least one entire at least one of the winding coil and rod, and only the groove areas.

4. A method of curing at least one of a winding coil and a rod of an electrical machine, the at least one of the winding coil and rod having a groove face area and a coil face area and includes at least one individual conductor Provided with a curable material, comprising:

inductively heating one of i) a coated conductor insulation of the at least one individual conductor and, ii) a conductor assembly including the at least one individual conductor;

pressing the at least one of the winding coil and rod, the pressing step being performed at least one of i) prior to, ii) during, and iii) after the inductively heating step;

cooling the at least one of the winding coil and rod;

inductively heating at least one of i) the entire at least one of the winding coil and rod, and ii) only groove areas in the grooves of the at least one of the winding coil and rod;

simultaneously with the inductively heating step, cooling a coil face not to be cured; and after the inductively heating step, cooling, via at least one of the inductive heating system and an additional cooling system, the inductively heated at least one entire at least one of the winding coil and rod, and only the groove areas.

5. A method of curing at least one of a winding coil and a rod of an electrical machine, the at least one of the winding coil and rod having a groove face area and a coil face area and includes at least one individual conductor provided with a curable material, comprising the steps of:

inductively heating one of i) a coated conductor insulation of the at least one individual conductor and, ii) a conductor assembly including the at least one individual conductor;

pressing the at least one of the winding coil and rod, the pressing step being performed at least one of i) prior to, ii) during, and iii) after the inductively heating step; and cooling the at least one of the winding coil and rod;

wherein the steps are performed one of i) continuously on an assembly line, ii) via a single-stage press, and iii) via a multistage press.

6. A device for heating at least one of winding coils and rods of electrical machines, comprising:

an arrangement receiving the at least one of winding coils and rods, the at least one of winding coils and rods including groove areas, coil face areas, and at least one individual conductor provided with a curable material; and an inductor heating the at least one of winding coils and rods, the inductor being separate from the at least one of winding coils and rods.

7. The device according to claim 6, further comprising:

an arrangement for pressing the at least one of winding coils and rods at least one of i) prior to, ii) during, and iii) after, the at least one of winding coils and rods are heated by the inductor.

8. The device according to claim 7, further comprising:

at least one first cooling system for cooling the groove areas and coil face areas.

9. The device according to claim 8, further comprising:

a second cooling system for cooling at least one of the inductor and the at least one first cooling system.

10. The device according to claim 6, wherein the arrangement receiving the at least one of the winding coils and rods includes a pressing device, the inductor heating contents of the pressing device, and further includes an arrangement for subsequently cooling the contents of the pressing device as the arrangement receiving the at least one of the winding coils and rods moves continuously on an assembly line, a heating of the at least one of winding coils and rods being controllable via a velocity of the assembly line.

11. The method according to claim 1, further comprising:

positioning the at least one of the winding coil and rod adjacent to an inductor, the inductor being separate from the at least one of the winding coil and the rod.

* * * * *